UNITED STATES PATENT OFFICE 2,644,001

PROCESS FOR PREPARING ESSENCE D'ORIENT OR PEARL TINCTURE

François Buitelaar, Vlaardingen, Netherlands, assignor to N. V. "De Zilvervisch," Rotterdam, Netherlands, a corporation of the Netherlands No Drawing. Application May 4, 1950, Serial No. 160,101. In the Netherlands October 24, 1947

14 Claims. (Cl. 260—252)

The present application is in the nature of a continuation-in-part of my copending application for a Process for Preparing Essence d'Orient or Pearl Tincture, Serial No. 54,575, filed October 14, 1948.

This invention relates to a process for preparing essence d'Orient or pearl tincture from marine animals and the like and particularly from fish and parts thereof.

The main object of my invention is to use fish, and especially fish heads, scales, swimming bladders and other silver white parts of fish for preparing the essence d'Orient or pearl tincture.

Another object is to have an economical process for producing the tincture indicated by mainly using scrap or excess parts of fish and the like as raw or starting material and thereby obtaining a valuable product from erstwhile scrap or refuse material.

A further object is to increase the yield from the starting material used by subjecting the material to a special treatment which preserves the protein and protoplasm in the starting material to make the same available with the bulk of the latter for arriving at the desired end product.

It is, of course, a practical object to use for the present process easily available materials in good supply on the market.

Likewise, it is an object of the invention to use for the treatment of the starting materials in the process easily available water immiscible liquids and readily provided moderate temperatures and conditions of treatment in the process.

Other objects and advantages of my invention will appear in further detail as the specification proceeds.

The so-called essence d'Orient consists of a suspension of natural guanine crystals mainly found in the scales, the skin and the swimming bladders of various species of fish. Especially the scales of Brama Raii are used for the preparation of the essence, which is a well-known starting material for the preparation of synthetic pearls. Moreover the pearl tincture finds a wide application in the preparation of lacquers and varnishes.

The earliest method for the preparation of pearl tincture is based upon the use of diluted ammonia. The fact is that natural guanine crystals lie imbedded in cell protoplasm, mainly consisting of protein substances. A mechanical treatment of the scales, such as shaking, agitating or kneading liberates part of the crystals from the scales. However, when treated in this way, they remain enveloped in protein layers diminishing their gloss. Therefore this protein substance is ordinarily removed by means of an alkaline bath. However, this method is very cumbersome, necessitating repeated washings and separations of the guanine crystals and involving loss of the proteins.

It has already been proposed (in U. S. Patent 1,525,317) to destroy these protoplasm substances by means of treatment with soap, saponine or protein splitting enzymes. These treatments take a rather long time, and in most cases the starting materials must be protected against the action of bacteria by means of antiseptics. Moreover, the pearl tincture obtained must additionally be purified by repeated washings and sedimentations.

It has furthermore been proposed (in U. S. Patent 1,760,771) to purify the essences obtained by one of the above methods by a treatment with liquids, which are not miscible with water. To this end, the essence is transformed into an aqueous slurry by sedimentation or centrifugation. This slurry is treated with the liquids mentioned above, the guanine being transferred into these liquids with the impurities remaining in the aqueous layer. This method has the disadvantage that emulsions are often obtained which cannot be separated when once formed. Besides, this operation must be repeated several times and is carried out by adding water to the suspension of guanine in the water immiscible solvent, then agitating, separating again etc., until the pearl tincture has been sufficiently purified. Another disadvantage of these operations is that agglomeration of the crystals, attended with loss of glittering, might easily occur. In order to lessen the difficulty of the formation of emulsions, at least to some degree, solutions of higher viscosity are used; a solution of collodion in amyl acetate is used, for instance, which is mixed with an ammoniacal aqueous suspension of guanine; the resulting buttery paste separates water which is removed, and then water can be added again. After repeated washings a sufficiently purified product is obtained.

Now, in the practice of my invention, it has been found that it is possible to obtain a very pure essence d'Orient from such starting materials as scales, swimming bladders and skin membranes of fish, and the like, by a direct method, namely by heating these starting materials for a short time and then treating them with a water immiscible liquid. Thus a suspension of very pure guanine crystals in the water immiscible liquid is obtained, which is easily separable from the aqueous mass of starting materials. In a simple way, for example by filtration or centrifugation, the crystals themselves may be recovered from this suspension and suspended in any desired liquid.

The heating may be carried out in various ways. Thus it is possible to heat the aqueous starting materials in an oven or to treat them with hot air. A particularly good result is obtained by heating directly or by heat exchange with water. The heating time of the starting materials, in any event, depends on the temperature used. Thus in water of about 65° C. heating during 15 seconds is sufficient; at 90° C., 2 to 3 seconds is enough, if the starting materials consist of scales. The heating time thus also depends on the character of the raw materials. Preferably the heating is carried out at temperatures ranging from 65 to 100° C., for less than 10 minutes, but higher temperatures may be used in some cases. The heating time depends not only on the temperature, but also on the starting material. If the starting material consists of whole fish, the time of heating in water of 80° C. may be about one minute; by heating in water of 65° C. it is from 5 to 10 minutes. It is also possible in some cases to use higher temperatures than 100° C. for a short time. Also it may be steam treated for a short time. By this heating process the cohesion of the cellular tissue is diminished; in this way it is possible to set free the guanine crystals from the surrounding material by mechanical means, without adding protoplasm destroying substances as splitting enzymes or detergents as soap or saponine.

After the short heat treatment, the starting materials are introduced into a water immiscible liquid, in which the guanine crystals are then easily collected by a mechanical movement, whereas the impurities are left in the aqueous starting materials. The crystals may be obtained by shaking or agitating. However, the starting materials are preferably treated in rotating perforated drums, or in rotating containers, manufactured from metal gauze in which the meshes are chosen according to the size of the particles of the starting materials. The treatment is usually carried out at room temperature. However, lower as well as higher temperatures may be used.

As water immiscible liquids for my process, esters may be used such as amyl acetate, or liquid fats, or hydrocarbons, such as benzene, toluene, xylene, petroleum ether, ethers, carbon disulfide, organic chlorine compounds, such as chloroform, carbon tetrachloride, tetrachloroethane and the like will serve. Mixtures of such liquids in any manner or proportions may also be used in this process for flotation treatment of the starting materials.

The flotation with the water immiscible liquids is carried out for a short period of time varying from one to a few minutes. As a rule, within some minutes, practically all of the guanine crystals are present in the liquid, but usually the treatment is continued for a longer time. The suspending liquid is then separated from the materials in suspension, for instance by decanting or filtering through coarse filters until no more of the materials are left behind in the rotating drum. As a rule, an aqueous layer containing mineral and organic impurities separates from the liquid which is left. Depending upon the specific gravity of the water immiscible liquid, this aqueous layer separates at the top or at the bottom and is removed in conventional manner. The guanine crystals are then separated from the non-aqueous liquid by the usual method, as by filtration, sedimentation or centrifugation.

This guanine suspension still contains a small quantity of impurities in the shape of mucous or mucilaginous substances, affecting the quality of the final product unfavorably by a diminished gloss.

According to one of the characteristics, it is possible to prepare a very pure essence d'Orient, when care is taken, that the suspending medium in one of the operations has a specific gravity of such value that the guanine crystals remain in the suspension and the impurities, especially the mucous substances, float on the surface and in this way may easily be separated. The suspension freed from mucous substances may be further worked up in the usual way, for example by taking up the pure crystals in any desired liquid, dependent on a further working up of the suspension.

Preferably the specific gravity of the suspending medium should range from 1.1 to 1.35. If separated by centrifugation, it depends to some extent upon the centrifuge used for separating the mucous substance, which specific gravity is most favorable. Thus, it was determined to be 1.27 for a certain centrifuge, and 1.16 for another.

In order to obtain the desired separation, the starting materials may be directly treated with the water immiscible liquid after heating, or with a mixture of water immiscible liquids with the desired specific gravity. The disadvantage that heavier impurities, such as sand and the like tend to remain in the suspension, may be easily overcome by filtering the suspension, after separation of the aqueous layer and the mucous substances, through a suitable filter, for example a cloth filter, in which the coarser particles are left on the filter and the finer guanine crystals pass through.

However, it is advantageous to treat the starting materials after heating, with a water immiscible liquid as indicated, having a lower specific gravity. This liquid, being separated from the starting materials also containing the heavier impurities, is then adjusted at the desired specific gravity by mixing with heavier liquids and then the mucous substances are separated.

In other words this process consists in heating of the starting material, mixing said materials with a water immiscible liquid having a specific gravity less than one, separating from the residues of the fish-slurry and the heavier impurities, e. g. by skimming and filtering, centrifuging to concentrate the guanine, mixing with a liquid or a mixture of liquids, immiscible with water, to bring the specific gravity to 1.1–1.35; separating of the floating mucous substances and the remaining water by removing them, preferably by centrifuging.

The remaining mass of guanine paste may be washed in the centrifuge by treating with white spirit and subsequently by treating with amylacetate.

Thus, when white spirit is used as a suspending medium, about two parts of trichloro ethylene are added per part of white spirit, whereby the specific gravity is adjusted at 1.27. Also other liquids having a high specific gravity, such as carbon tetrachloride, tetrachloro-ethane and tetrachloroethylene are suitable for this purpose.

The process according to the invention presents the advantage of being very simple, rapid and cheap. It is not necessary to start exclusively from fish scales, particularly of the scales of Brama Raii, as was usual heretofore. In order to obtain these scales, fishing must be carried out in a special manner.

If fishing is carried out in the usual way, fish substantially without scales are obtained. It has now been found, however, that this fish caught in the usual way may themselves be used as a starting material. All possible sorts of fish, such as Brama Raii, herring and the like, having a silver white skin, are suitable. To this end the whole fish, without pretreatment, is subjected to the treatment outlined according to the present invention. It is also possible to start from preserved fish, such as salted fish. An important advantage herein is that the yield becomes much greater than in the previous processes. Up to now, 1000 kilograms of Brama Raii gave 25 kg. of scales which scales yielded about 1 kg. of essence d'Orient. By application of the process according to the invention from 1000 kg. of Brama Raii without scales, 5 kg. of essence d'Orient are obtained. In the case of herring these values are of the same order of magnitude.

The process will be further illustrated by the following examples, but it should be understood that these are given only by way of illustration and not by way of limitation.

Example 1

1000 kg. of Brama Raii, spread out in thin layers, are immersed in water of 80° C. for one minute. After cooling, the fish is mixed with about 600 liters of white spirit in a kneading-machine and agitated with it during a period of 30 minutes. The white spirit is then skimmed off and liberated from the residues of the fish-slurry by filtering through a coarse filter.

On centrifuging this suspension, about 5 kg. of a pasty guanine slurry is obtained. These 5 kg. are mixed with 4 kg. of white spirit and 16 kg. trichloro ethylene; thus the specific gravity is adjusted at 1.27 and the mucous substances come floating to the surface. The aqueous layer with the mucous substances are then removed in a centrifuge of 40 cm. diameter and at about 1200 revolutions per minute, whereby the fish silver is deposited upon the wall as a putty-like mass. This mass is then treated in the same centrifuge with 20 kg. of white spirit and subsequently with 20 kg. of amyl acetate which is drained off in order to remove possible residues of fish-oil. Finally about 4.5 kg. of paste of guanine crystals of a very pure quality is left as the desired residue.

Example 2

1000 kg. of herring-heads treated in the same way as outlined in Example 1, yield about 3.5 kg. of paste of guanine crystals after first centrifuging, and after final working up, about 3 kg. of the purified paste remains as the desired end product.

Example 3

150 kg. of swimming bladders of herring are exposed in flat layers to the influence of steam at 100° C. during 5 seconds. After cooling, they are mixed with 100 liters of white spirit in a kneading-machine during a period of 15 minutes. As in Example 1, the white spirit is then skimmed off and separated from the starting materials by filtration through a coarse filter. About 6 kg. of guanine paste is separated from the white spirit by centrifugation. This paste is mixed with 6 kg. of white spirit and 20 kg. of trichloro ethylene, after which the resulting mixture is centrifuged at about 1500 revolutions per minute in a centrifuge of 40 cm., more or less in diameter. After removing as much liquid as possible, the remaining guanine slurry is washed in the centrifuge with 30 liters of white spirit and then with 30 liters of amyl acetate, which are drained off or decanted. After these operations, about 5.5 kg. of guanine having a particularly good quality is left as the residue or desired end product.

Manifestly, variations in the preparations and kinds of water immiscible liquids and the starting materials may be resorted to, and steps and features may either be further modified than as given in the foregoing, or used without others or in different combinations and associations than appear in the above examples, so long as they fall within the scope of the appended claims.

Having now fully described my invention, I claim:

1. A process of preparing essence d'Orient consisting essentially of natural guanine crystals from at least one member selected from the group consisting of whole fish and fish parts which comprises heating said fish material for a maximum of 10 minutes at a temperature of about 65°–100° C., adding thereto a water-immiscible liquid, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

2. A process of preparing essence d'Orient consisting essentially of natural guanine crystals from at least one member selected from the group consisting of whole fish and fish parts which comprises heating said fish material immersed in hot water for a maximum of 10 minutes at a temperature of about 65°–100° C., adding thereto a water-immiscible liquid, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

3. A process of preparing essence d'Orient consisting essentially of natural guanine crystals from at least one member selected from the group consisting of whole fish and fish parts which comprises heating said fish material in the presence of heated water vapor for a maximum of 10 minutes at a temperature of about 65°–100° C., adding thereto a water-immiscible liquid, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

4. A process of preparing essence d'Orient consisting essentially of natural guanine crystals from at least one member selected from the group consisting of whole fish and fish parts which comprises heating said fish material for a maximum of 10 minutes at a temperature of about 65°–100° C., adding thereto a water-immiscible liquid, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals by flotation, and recovering a mass of guanine crystals from the water immiscible liquids.

5. A process of preparing essence d'Orient consisting essentially of natural guanine crystals from at least one member selected from the group consisting of whole fish and fish parts which comprises heating said fish material for a maximum of 10 minutes at a temperature of about 65°–100° C., adding thereto a water-immiscible liquid, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals by centrifuging, and recovering a mass of guanine crystals from the water-immiscible liquids.

6. A process of preparing essence d'Orient consisting essentially of natural guanine crystals from whole fish and fish parts which comprises heating said fish material for a maximum of 10 minutes at a temperature of about 65°–100° C., adding thereto a water-immiscible liquid having a specific gravity less than 1, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

7. A process of preparing essence d'Orient consisting essentially of natural guanine crystals from whole fish and fish parts which comprises heating said fish material immersed in hot water for a few seconds at a temperature of about 80°–100° C., adding thereto a water-immiscible liquid, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

8. A process of preparing essence d'Orient consisting essentially of natural guanine crystals from whole fish and fish parts which comprises heating said fish material in the presence of heated water vapor for a few seconds at a temperature of about 80°–100° C., adding thereto a water-immiscible liquid, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

9. A process of preparing essence d'Orient consisting essentially of natural guanine crystals from whole fish and fish parts which comprises heating said fish material for a maximum of 10 minutes at a temperature of about 65°–100° C., adding thereto a water-immiscible liquid, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, purifying said guanine crystals, and recovering a mass of pure guanine crystals.

10. process of preparing essence d'Orient consisting essentially of natural guanine crystals from at least one member selected from the group consisting of whole fish and fish parts which comprises heating said fish material for a maximum of 10 minutes at a temperature of about 65°–100° C., adding thereto a water-immiscible liquid hydrocarbon, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

11. A process of preparing essence d'Orient consisting essentially of natural guanine crystals from at least one member selected from the group consisting of whole fish and fish parts which comprises heating said fish material for a maximum of 10 minutes at a temperature of about 65°–100° C., adding thereto a water-immiscible liquid chlorinated organic compound, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

12. A process of preparing essence d'Orient consisting essentially of natural guanine crystals from at least one member selected from the group consisting of whole fish and fish parts which comprises heating said fish material for a maximum of 10 minutes at a temperature of about 65°–100° C., adding thereto carbon disulfide as a water-immiscible liquid, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

13. A process of preparing essence d'Orient consisting essentially of natural guanine crystals from at least one member selected from the group consisting of whole fish and fish parts which comprises heating said fish material for a maximum of 10 minutes at a temperature of about 65°–100° C., adding thereto amyl acetate as a water-immiscible liquid ester, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

14. A process of preparing essence d'Orient consisting essentially of natural guanine crystals from at least one member selected from the group consisting of whole fish and fish parts which comprises heating said fish material for a maximum of 10 minutes at a temperature of about 65°–100° C., adding thereto a water-immiscible liquid selected from the group consisting of esters, liquid fats, ethers, mixtures thereof, benzene, toluene, xylene, petroleum ether, chloroform, carbon tetrachloride and carbon tetrachloroethane, agitating said liquid whereby the guanine crystals are collected therein, filtering said liquid through a coarse filter to rid it of any fish residues, adding another water-immiscible liquid thereto in order to adjust the specific gravity of the water-immiscible liquids to about 1.1–1.35, separating the upper aqueous layer containing impurities and the undesirable mucous substances from the lower layer consisting of the mixture of water-immiscible liquids containing the guanine crystals, and recovering a mass of guanine crystals from the water-immiscible liquids.

FRANÇOIS BUITELAAR.

No references cited.